United States Patent
Manjrekar et al.

(10) Patent No.: US 7,818,323 B2
(45) Date of Patent: Oct. 19, 2010

(54) DISCOVERING TOPICAL STRUCTURES OF DATABASES

(75) Inventors: Rajesh P. Manjrekar, San Jose, CA (US); Berthold Reinwald, San Jose, CA (US); John Sismanis, San Jose, CA (US); Wensheng Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/034,964

(22) Filed: Feb. 21, 2008

(65) Prior Publication Data

US 2009/0216799 A1 Aug. 27, 2009

(51) Int. Cl.
  G06F 7/00 (2006.01)
  G06F 17/30 (2006.01)
(52) U.S. Cl. .............. 707/738; 707/737; 707/736; 707/802; 707/803
(58) Field of Classification Search ............ 707/738, 707/737, 736, 802, 803
See application file for complete search history.

(56) References Cited

U.S. PATENT DOCUMENTS

| | | | |
|---|---|---|---|
| 5,875,446 | A | 2/1999 | Brown et al. |
| 7,246,136 | B2 | 7/2007 | Cameron et al. |
| 2003/0220913 | A1* | 11/2003 | Doganata et al. .......... 707/3 |
| 2006/0161517 | A1 | 7/2006 | Bhattacharjee et al. |
| 2008/0005137 | A1* | 1/2008 | Surendran et al. ........ 707/101 |
| 2008/0228745 | A1* | 9/2008 | Markus et al. ............ 707/5 |
| 2009/0055368 | A1* | 2/2009 | Rewari et al. ............ 707/4 |

OTHER PUBLICATIONS

Wu Wensheng, et al., "Discovering Topical Structures of Databases" Jun. 12, 2008, SIGMOD '08 ACM, p. 1019-1030.*
Ralitsa Angelova, et al., "Graph-based Text Classification: Learn from Your Neighbors," Dynamically Evolving, Large Scale Information Systems, 2006, pp. 485-492.
Ralitsa Angelova, et al., "A Neighborhood-Based Approach for Clustering of Linked Document Collections," MPI-I-2006-5-005, Aug. 2006.
Kulis, B., et al., "Semi-supervised Graph Clustering: A Kernel Approach," Proceedings of the 22nd International Conference on Machine Learning, Bonn, Germany, pp. 457-464, Aug. 2005.

* cited by examiner

Primary Examiner—Apu M. Mofiz
Assistant Examiner—Brent Stace
(74) Attorney, Agent, or Firm—Gibb I.P. Law Firm, LLC

(57) ABSTRACT

A system and method for automatically discovering topical structures of databases includes a model builder adapted to compute various kinds of representations for the database based on schema information and data values of the database. A plurality of base clusterers is also provided, one for each representation. Each base clusterer is adapted to perform, for the representation, preliminary topical clustering of tables within the database to produce a plurality of clusters, such that each of the clusters corresponds to a set of tables on the same topic. A meta-clusterer aggregates results of the clusterers into a final clustering, such that the final clustering comprises a plurality of the clusters. A representative finder identifies representative tables from the clusters in the final clustering. The representative finder identifies at least one representative table for each of the clusters in the final clustering. The representative finder also arranges the representative tables by topic as a topical directory and outputs the topical directory.

15 Claims, 11 Drawing Sheets

SimClust($T$, $M$, *ClsrSim*, $Q$) → $C$

Input: $T$, a set of table $\{T_1, T_2, ..., T_{|T|}\}$;
    $M$, a similarity matrix for the tables in $T$;
    *ClsrSim*, a cluster similarity function;
    $Q$, a clustering quality metric
Output: $C$, a partition of tables in $T$ 1. Set up initial clusters:
    1.1 Let $i = 1$
    1.2 Let $C^1 = \{\{T_1\}, \{T_2\}, ..., \{T_{|T|}\}\}$
2. Repeat until $|C^i| = 1$
    2.1 Evaluate the quality of $C^i$ via $Q$
    2.1 Evaluate the similarities of clusters in $C^i$ via *ClsrSim*
    2.2 Find $C_x, C_y \in C^i$ with a maximum similarity
    2.3 Merge clusters $C_x$ and $C_y$
    2.4 $i \leftarrow i + 1$
3. Return $C^i$ with a maximum $Q$ value

FIG. 4

**LinkClust(*T*, *G*, EdgeDel, $Q'$) → *C*
Input:** *T*, a set of tables;
 *G*, a linkage graph for the tables in *T*;
 *EdgeDel*, a function that suggests edges to be removed;
 $Q'$, a clustering quality metric
Output: *C*, a partition of tables in *T*

1. Let $i = 1$
2. Repeat until *G* has no edges
    2.1 Let $C^i$ = connected components in *G*
    2.1 Evaluate the quality of $C^i$ via $Q'$
    2.2 Let $E_c$ = EdgeDel(*G*)
    2.3 Remove edges in $E_c$ from *G*
    2.4 $i \leftarrow i + 1$
3. Return $C^i$ with a maximum $Q'$ value

FIG. 5

Invoice Status      Invoice Term      *Shipment*
*Invoice*      InvoiceItem      ShipmentMethod
(a) $C_1$'s linkage graph        (b) $C_2$'s linkage graph
Product      *ProductCategory*      Category
(c) $C_3$'s linkage graph
FIG. 9

DISCOVERING TOPICAL STRUCTURES OF DATABASES

BACKGROUND

1. Field of the Invention

The embodiments of the invention generally relate to a system and method for automatically discovering topical structures of databases.

2. Description of the Related Art

A large enterprise typically has a huge number of databases that are increasingly complex. For example, the database for a single SAP installation might now contain hundreds or even thousands of tables, storing several terabytes of data. To make things worse, the documentation and metadata for these enterprise databases are often scattered throughout the IT departments of an enterprise they are incomplete, inaccurate, or simply missing. In fact, recent study indicates that up to 70% of a data architect's time is actually spent on discovering the metadata of databases. Thus, the scale of the databases along with the prevalent lack of documentation, make it a daunting task for data architects and application developers to understand the databases and incur significant cost in integrating the databases.

SUMMARY

Embodiments herein disclose a multi-strategy learning method for the automatic categorization of the tables in a database. The problem of automatic categorization of the tables in a large database based on their topics is of interest. Knowing such topics and representative tables for each topic greatly helps the database users and application developers in understanding the content of the database, and largely facilitates the system integrators in consolidating multiple databases. Such a categorization is rarely available as part of design documentation for the database.

In view of the foregoing, an embodiment of the invention provides a system and method for automatically discovering topical structures of at least one database comprising tables. A model builder is adapted to compute various kinds of representations for the database based on schema information and data values of the database. The model builder is adapted to compute vector-based representations, graph-based representations, similarity-based representations, etc.

In the vector-based representations, each table of the database is represented as a text document. In the graph-based representations, the database is represented as a graph, tables of the database are represented as nodes, and edges of the graph are represented as linkages between the tables. In the similarity-based representation, the database is represented as a similarity matrix with table similarities computed from attribute values.

A plurality of base clusterers is also provided, one for each representation. Thus, each base clusterer corresponds to one representation. Each base clusterer is adapted to perform, for a corresponding representation, preliminary topical clustering of tables within the database to produce a plurality of clusters, such that each of the clusters corresponds to a set of tables on the same topic. Each base clusterer is adapted to perform similarity-based clustering, linkage-based clustering, etc.

A meta-clusterer aggregates results of the base clusterers into a final clustering, such that the final clustering comprises a plurality of the clusters. A representative finder identifies representative tables from the clusters in the final clustering. The representative finder identifies at least one representative table for each of the clusters in the final clustering based on table importance. The representative finder also arranges the representative tables by topic as a multi-level topical directory (topical structure) and outputs the topical directory.

Thus, stated broadly, the embodiments herein perform topical clustering of tables within the database to produce the plurality of preliminary clusterings and aggregate the preliminary clusterings into a final clustering, such that the final clustering comprises a plurality of the clusters. The system/method arranges the clusters by topic as a topical directory and outputs the topical directory.

The embodiments formally define the problem of discovering the topical structure of a database. They use a multi-strategy learning framework for the discovery of topical structures. Further, the embodiments describe a system that automatically discovers the topical structure of a database based on this framework.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 4 is diagram illustrating a method in pseudo code;

FIG. 5 is diagram illustrating a method in pseudo code;

FIG. 9 is a schematic diagram illustrating relations between tables; and

DETAILED DESCRIPTION OF EMBODIMENTS

Figure 1A:
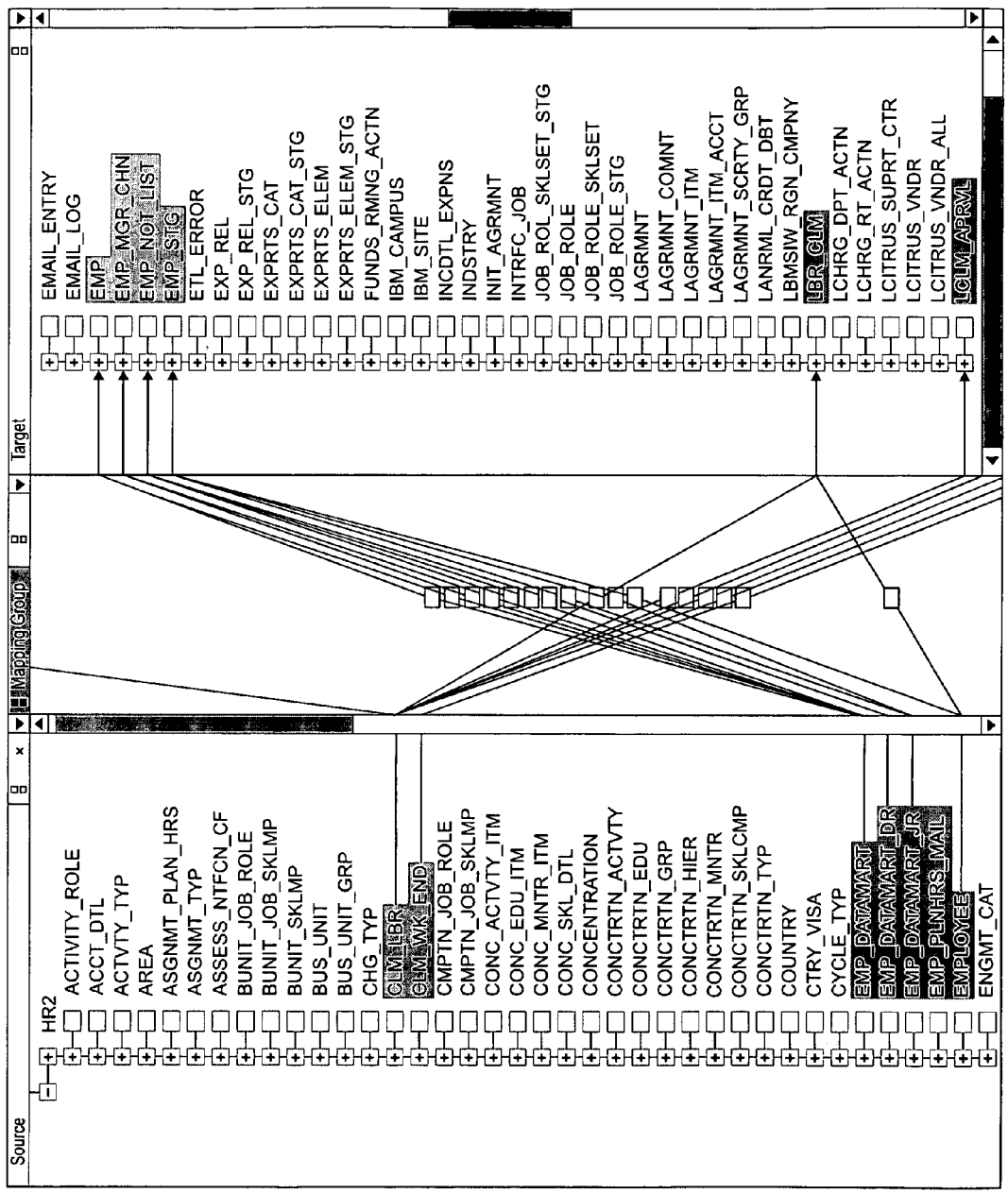
FIG. 1(a) shows tables in two databases without being organized by topics.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

1. Introduction

The increasing complexity of enterprise databases and the prevalent lack of documentation incur significant cost in both understanding and integrating the databases. Existing solutions addressed mining for keys and foreign keys, but paid little attention to more high-level structures of databases. In this disclosure, the embodiments consider the problem of discovering topical structures of databases to support semantic browsing and large-scale data integration. The embodiments describe a discovery system based on a multi-strategy learning framework. Embodiments herein exploit varied evidences in database schema and instance values to construct multiple kinds of database representations. Embodiments herein employ a set of base clusterers to discover preliminary topical clusters of tables from database representations, and then aggregate them into final clusters via meta-clustering. To further improve the accuracy, the embodiments extend with multiple-level aggregation and clusterer boosting techniques. The embodiments introduce a new measure on table importance and propose an approach to discovering cluster representatives to facilitate semantic browsing. A feature of the framework is that it is highly modular and extensible, where additional database representations and base clusterers may be easily incorporated into the framework. The embodiments discover topical clusters in the databases with a high degree of accuracy.

To illustrate these challenges, consider a data architect who tries to understand and integrate two large Human-Resource databases HR2 and HR3, shown in the source and target panes of FIG. 1(a) respectively. Suppose that HR2 has 200 tables, HR3 has 300 tables, and on the average there are 10 attributes per table. Both databases were designed by contractors and have been in service for several years. The designers may have left the company but did not leave any design documents. Furthermore, the implementation of the databases might not be consistent with the design. For example, the referential relationships of tables often are not enforced in the databases, due to varied reasons including the cost of enforcing the constraints. All these make it extremely difficult for the data architect to understand, reverse-engineer, and integrate the databases.

One step in integrating the databases is to identify the semantic correspondences or mappings among the attributes from different databases. The scale of the databases again poses serious challenges to this schema matching task. Existing matching solutions typically attempt to find mappings between every two attributes. This all-to-all approach is based on the assumption that the databases are small and all attributes in one database are potentially relevant to all attributes in another database. This assumption might not hold for large databases. For example, tables in both HR2 and HR3 may be naturally divided into several subject areas or topics such as employee and claim, and the tables from different subject areas are likely not very relevant. As a result, the all-to-all approach is inefficient in that it requires 6M attribute-level comparisons, and inaccurate in that it may match many attributes from irrelevant tables. To illustrate, arrows in FIG. 1(a) indicate tables whose attributes are matched by this approach. (To avoid the cluttering, not all arrows are shown.) For example, a false mapping is discovered between attribute emp_id of table employee in HR2 and labor claim id of labor_claim_id of LBR_claim (labor claim) in HR3, which contain very similar data values.

To address these challenges, the embodiments consider the problem of discovering the topical structure of a database that reveals how the tables in the database are organized based on their topics or subject areas. Conceptually, each topic or subject area comprises a group of closely related entities, where each entity may be represented by multiple tables in the database (e.g., due to normalization).

Figure 1B:
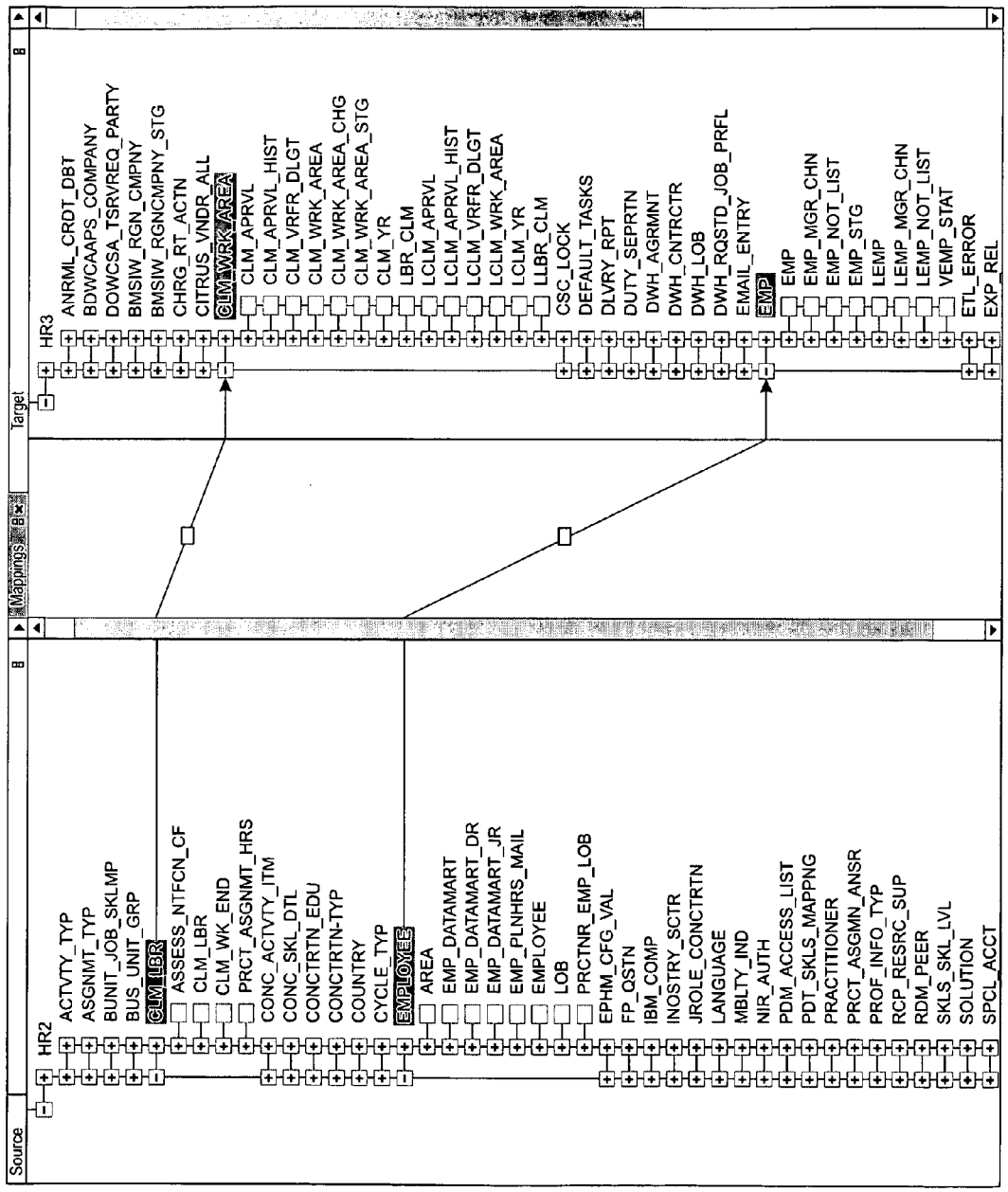
FIG. 1(b) shows the same tables but organized by topics.

The topical structure of a database provides an intuitive way of browsing the semantic content of the database, and helps users to quickly find relevant information in a large database. For example, FIG. 1(b) shows the tables in HR2 and HR3 organized by their topics, where each topic is labeled with the name of the most representative table among all the tables on that topic (details are given in Section 5). For example, in HR2, the eight tables on the employee information are grouped under the topic employee.

Knowing topical structures of databases also enables a new approach to matching large database schemas that is both more scalable and more effective than the previous all-to-all approach. Specifically, the matching of two large schemas can now be done in a top-down, divide-and-conquer fashion. First, the embodiments find similar topics in two databases, where each topic may be simply represented as a text document, e.g., comprising tokens in table names, attribute names, and data values from the tables on that topic. Suppose that HR2 has 20 topics and HR3 has 30 topics. This step involves only 600 comparisons (between text documents), a huge saving from the 6M attribute-level comparisons required by the previous approach. To illustrate, FIG. 1(b) shows several similar topics discovered between HR2 and HR3, indicated by arrows. For example, topic employee in HR2 is similar to emp in HR3, and clm_lbr in HR2 to clm_wrk_area (claim work area) in HR3. Next, the embodiments can focus the further matching effort on the attributes from the tables on similar topics. This would avoid producing many false mappings between attributes from irrelevant tables, e.g., the mapping between employee_emp id and lbr_clm.labor_claim_id, discovered by the previous all-to-all approach.

The problem of mining structures of databases has been studied in the context of data cleansing and data integration. However, the focus of previous research was mostly on the discovery of keys, foreign keys, and functional dependencies, while the problem of discovering topical structures has received little attention. A related problem is schema summarization which produces an overview of a complex schema with important elements in the schema. It measures the importance of an element by the number of its relationship and attribute links and the cardinality of its data values. It is not concerned with the topics of the elements. For example, there may be multiple elements in the summary which are all on the same topic, or there may be no elements in the summary to represent the less dominant topics in the schema. In contrast, the goal is to categorize the elements by their topics and exploit the topical structures to not only facilitate semantic browsing but also address the scalability issue in existing schema matching solutions to support a large-scale integration. In addition, the embodiments introduce a new measure on table importance based on shortest paths, and propose an approach to discovering representative tables within each topic.

As discussed earlier, conceptual schemas are rarely available as part of the database design documentation. Furthermore, previous methods largely rely on manually specified semantic links among the elements, such as is-a and aggregation relationships. In contrast, the solution herein does not require this information. Data modeling products allow users to organize the entities in a large logical model by subject areas during a top-down modeling process, to cope with the complexity and facilitate a modular development. The solution herein complements these functions by enabling users to reverse-engineer subject areas from a large-scale physical database during a bottom-up modeling process.

In this disclosure, the embodiments describe a system that automatically discovers the topical structure of a database through clustering. Developing the embodiment required several innovations.

With respect to modeling databases, a first issue is how the embodiments should represent the database to the clustering process. There are many disparate evidences on the topical relationships among the tables, e.g., table and attribute names, attribute values, and referential relationships. As a result, it may be very difficult to come up with a single best representation. To address this challenge, the embodiments propose a modeling approach which examines the database from several distinct perspectives and computes multiple representations of the database based on its schema information and instance values.

The embodiments describe methods for constructing three very different kinds of representations: vector-based, graph-based, and similarity-based. In a vector-based representation, each table is represented as a text document and the database as a collection of documents; in a graph-based representation, the database is represented as a graph, where nodes are tables and edges indicate the linkages (e.g., referential relationships) between the tables; and in a similarity-based representation, the database is represented as a similarity matrix with table similarities computed from attribute values.

With respect to combining evidence, a second issue is which clustering method(s) the embodiments should employ to discover topical clusters from the database representation. Every method typically has its own strength and weakness, and some may be more suitable for certain representations than others. No single method can perform well over all representations. To address this challenge, the embodiments propose a discovery framework based on the multi-strategy learning principle. In this framework, a multitude of base clusterers are employed, each takes a representation and invokes a suitable clustering method to discover preliminary topical clusters of tables. The results from the base clusterers are then aggregated into final clusters via meta-clustering. The embodiments further propose several approaches to constructing generic similarity-based and linkage-based clustering methods and describe how to instantiate them into clusterers for different representations.

The proposed framework is (1) highly modular and extensible, where additional database representations and base clusterers can be easily incorporated to the system, to further improve its performance, and (2) provides an intuitive and principled way of combining evidences through aggregating the votes from the clusterers, rather than directly combining the disparate evidences from the database via an adhoc function.

With respect to handling complex aggregations, the embodiments extend the meta-clusterer, one component in the inventive framework. The meta-clusterer must identify and remove errors in the input clusterers and combine the strength of different clusterers, in order to produce better clusters. A similar problem has been studied in the context of clustering aggregation. Unfortunately, existing solutions suffer from several limitations.

First, flat aggregation: all base clusterers are aggregated at once by a single meta-clusterer. Nevertheless, some clusterers are inherently more similar than others. For example, clusterers using the same kind of representations may be more similar or correlated since they look at the database from similar perspectives. In other words, they are like experts with similar (but not exactly the same) expertise. Intuitively, it is easier to identify the errors made by an expert if the embodiments compare him to others with similar expertise. To address this limitation, the embodiments introduce the concept of similarity level for clusterers and propose an approach to organizing the clusterers into an aggregation tree to perform a multilevel aggregation. The embodiments show that the new aggregation approach significantly improves the embodiment's performance.

Second, equal combination: all the input clusterers are treated as being equally good by the meta-clusterer. Nevertheless, the performance of the clusterers may often vary a lot, depending on the characteristics of a particular data set: the same clusterer may perform well on one data set but very poorly on another. It is thus desirable to be able to dynamically adjust the weights of the clusterers on-the-fly so that the votes from the better-performing clusterers are weighted more. To address this problem, the embodiments propose a clusterer boosting approach and shows that it can effectively identify and boost "good" clusterers based on their run-time performance.

In summary, the embodiments formally define the problem of discovering topical structures of databases and demonstrate how topical structures can support semantic browsing and large-scale data integration. The embodiments propose a multi-strategy discovery framework and describe the embodiment system which realizes this framework. The system is fully automatic & highly extensible to other representations and clusterers. The embodiments propose clustering aggregation techniques to address limitations of existing solutions. The embodiments describe an approach to discovering representative tables using a new measure on table importance. The embodiments discover topical clusters of tables with a high degree of accuracy. The rest of the disclosure is organized as follows. Section 2 defines the problem and Sections 3-5 describe a system embodiment.

2. Problem Definition

Figure 2:
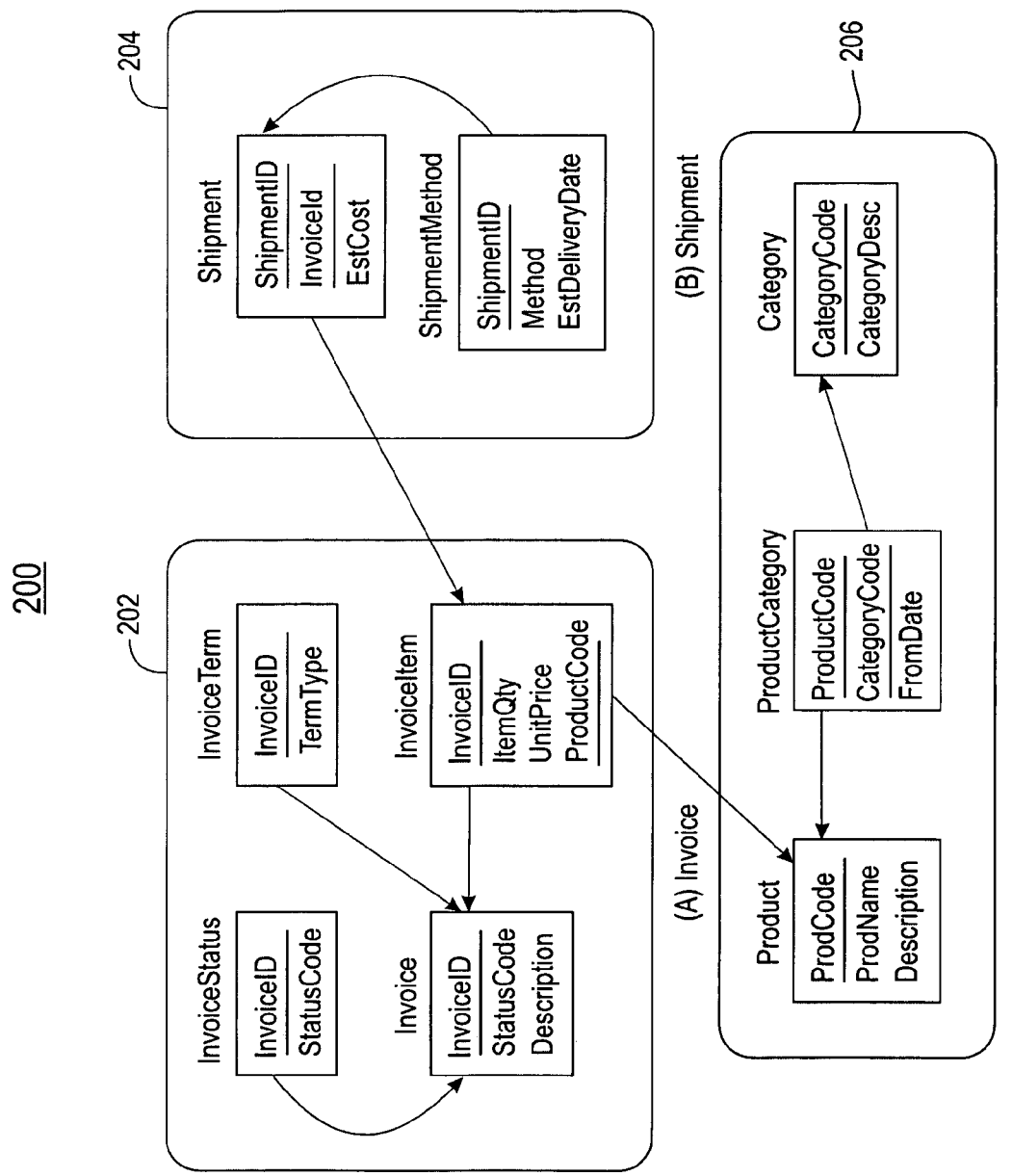
FIG. 2 is a schematic diagram illustrating tables and their referential relationships in an example database.

The embodiments first formally define the problem. The embodiments will use the invoice management database InvDB, shown in FIG. 2, as the running example. Note that key attributes are underlined and referential relationships between tables are indicated by directed lines from foreign keys to primary keys. Note also that these keys and foreign keys may not be documented or enforced and may need to be discovered (see Section 3.1.2). The embodiments can observe that the tables in InvDB (the tables 200 in FIG. 2) actually fall into three categories or topics: Invoice (the tables 202 in FIG. 2), Shipment (the tables 204 in FIG. 2), and Product (the tables 206 in Figure). The goal of the embodiment is then to automatically discover these topics and the tables on each topic. The embodiments start by defining topical relationship and structure.

For the Topical Relationship: Consider a set of topics P. Further, consider a database D with a set of tables, where each table T is associated with a topic $p \in P$, denoted as topic(T)=p. Then, there exists a topical relationship between two tables S and T, denoted as $\rho(S, T)$, if topic(S)=topic (T). For example, consider the database InvDB in FIG. 2. Suppose P={Invoice, Shipment, Product}. An example topical relationship is $\rho$(InvoiceItem, InvoiceTerm), since topic (InvoiceItem)=topic (InvoiceTerm)=Invoice.

Note that $\rho$ is transitive, i.e., if $\rho(R, S)$ and $\rho(S, T)$, then $\rho(R, T)$. Clearly, $\rho$ is both reflexive and symmetric. As a result, $\rho$ defines an equivalence class. The topics in P are assumed to be mutually exclusive, so each table in D may be associated with only one topic in P.

For the Topical Structure, the topical structure of a database describes how the tables in the database are grouped based on their topical relationship. More precisely, consider a set of topics P, a database D, and a topical relationship ρ between the tables in D with respect to P. The topical structure of D is given by the partition $C=\{C_1, C_2, \ldots, C_k\}$, formed by ρ over the tables in D, such that tables in the same group $C_i$ are on the same topic, while tables from different groups are on different topics. For example, a topical structure of InvDB with respect to the above P is: $\{C_1, C_2, C_3\}$, where $C_1$={InvoiceStatus, InvoiceTerm, Invoice, InvoiceItem}, $C_2$={Shipment, ShipmentMethod}, and $C_3$={Product, ProductCategory, Category}.

Based on the above definitions, the embodiments define the problem as follows. Note that the problem defined in the embodiments can be extended for multiple topics per table and hierarchical topical structure.

For the Problem Definition, given a database D with a set of tables, discover: (1) a set of topics P which the tables in D are about, and (2) the topical structure of D with respect to P in the form of a partition $C=\{C_1, C_2, \ldots, C_k\}$ over the tables in D, where k=|P|.

3. The Approach

Figure 3:
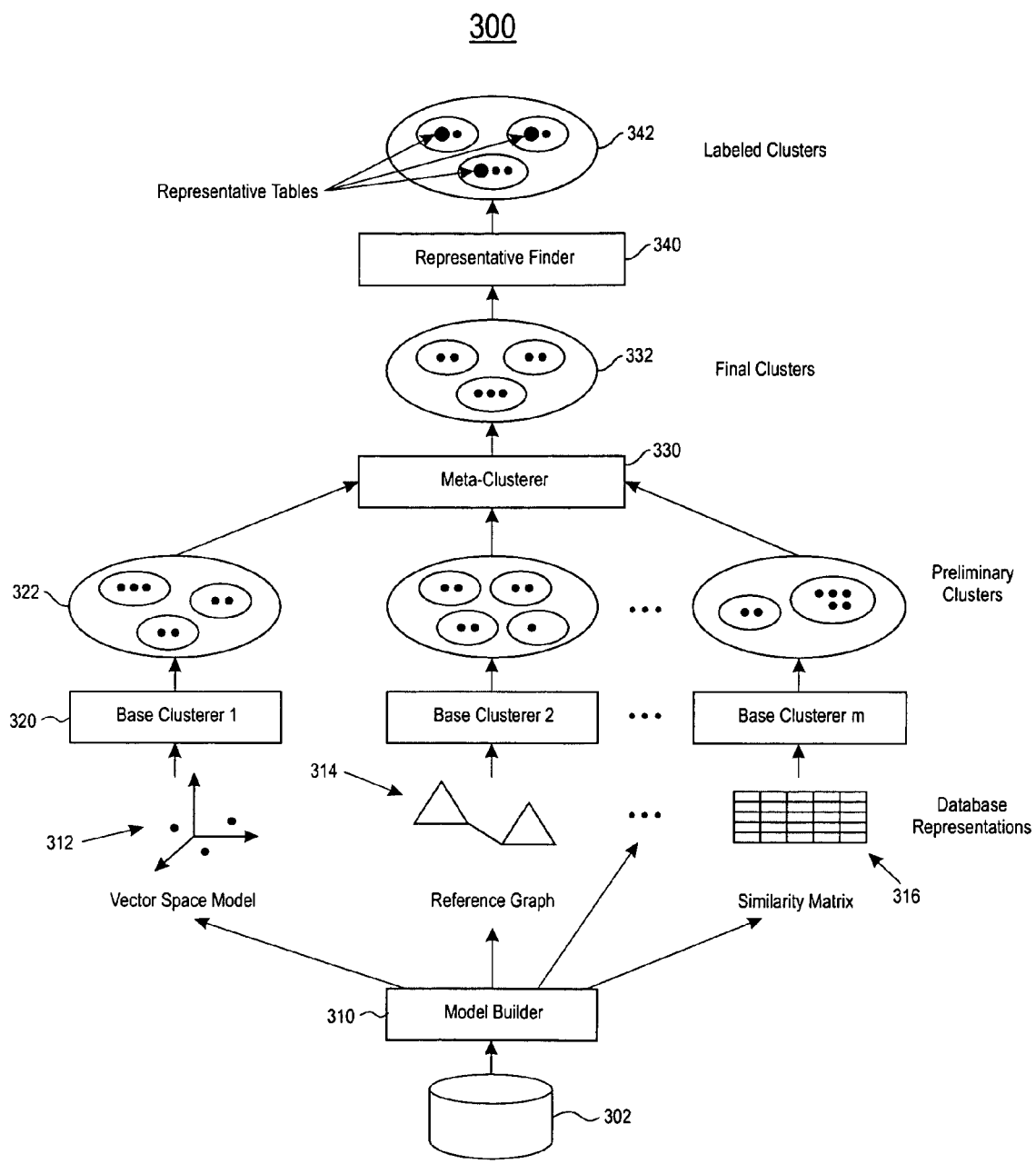
FIG. 3 is a schematic diagram illustrating method embodiments herein working through system embodiments herein.

As shown in FIG. 3, one embodiment 300 takes as the input a database 302 D with a set of tables, and returns the topical structure 342 of D as the output. This embodiment comprises four major modules: model builder 310, base clusterers 320, meta-clusterer 330, and representative finder 340. The embodiment proceeds as follows. First, the model builder 310 examines D from a number of perspectives and obtains a variety of representations for D. Next, each base clusterer takes a representation and discovers a preliminary topical clustering 322 (i.e., partition) of the tables in D. These results are then aggregated by the meta-clusterer 330 into a final clustering 332. Finally, the representative finder 340 takes the final clustering 332 and discovers representatives 342 in each cluster. This section describes the model builder 310, the base clusterers 320, and the meta-clusterer 330. Section 4 extends the meta-clusterer 330 to handle complex aggregations. Then Section 5 describes the representative finder 340.

3.1 The Model Builder

The model builder 310 constructs varied representations for the database 302 from its schema information and instance data. These representations fall into three categories: vector-based 312, graph-based 314, and similarity-based 316.

3.1.1 Vector-Based Representations

Vector-based representations 312 capture the topical structure of the database 302 via the descriptive information on the tables. In a vector-based representation 312, each table is represented as a text document and the database 302 as a collection of documents. Note that in these representations, the structures of individual tables are ignored. There are many possible ways of constructing such documents for the tables in the database 302, each resulting in a different representation of the database 302. For example, the document for a table may contain tokens from the name of the table, the names of its attributes, and the content of its attribute values. To illustrate, consider constructing documents for the tables in InvDB (FIG. 2), such that the document for each table contains tokens from both table and attribute names. Then the document d for the table InvoiceStatus will comprise tokens: Invoice, Status, ID, and Code, where both Invoice and Status occur twice in d.

Suppose that the number of unique tokens among the documents for the tables in the database 302 D is n. Then, each document d may be represented as an n-dimensional vector $<w_1, w_2, \ldots, w_n>$, where the i-th dimension corresponds to the i-th unique token in D, and $w_i$ is the weight of the token for the document d. Many weighting functions may be employed, e.g., the TF*IDF weight, and different functions may produce very different representations.

3.1.2 Graph-Based Representations

Graph-based representations 314 capture the topical structure of the database 302 via the linkage among the tables. Specifically, the database 302 is represented as a graph, where nodes are tables and edges indicate the linkage between the tables. An important linkage between two tables is their referential (i.e., FK-PK) relationship, where some attributes in one table (i.e., foreign keys) refer to some key attributes in the other table. For example, there is a referential relationship between table InvoiceTerm and table Invoice in InvDB, since the attribute InvoiceID in InvoiceTerm refers to the key attribute InvoiceID in Invoice.

However, the information on keys and foreign keys is often missing in the catalogs, for a variety of reasons including the cost of enforcing the constraints. In fact, keys and referential constraints are neither documented nor enforced by the system. To address this challenge, the embodiments implement a sampling-based method to discover primary keys and then proceed as follows to discover foreign keys.

Consider a key-attribute A in table T and an attribute B in table T'. B is determined to be a foreign key referring to A in T, if the following conditions are met: (1) $|B \cap A|=|B|$, i.e., B is a subset of A. This is a necessary condition for B to be a foreign key. (2) |B|>2, which is to avoid many false discovery for boolean attributes, since a boolean attribute may be contained in any other boolean/integer attributes. (3) |B|>0.8|A|, which is to ensure that the domain of B is sufficiently similar to that of A (not just contained). Note that if $|A| \leq 2$, then Condition 2 might not be satisfied even when Condition 3 is satisfied, e.g., when |A|=|B|=2. (4) NameSim(A,B)>0.5, where NameSim is a measure on the similarity (with range [0,1]) between attribute names.

3.1.3 Similarity-Based Representations

Similarity-based representations 316 capture the topical structure of the database 302 via the value-based similarity between the tables. The idea is that if two tables are about the same topic, they may have several attributes containing similar values. For example, the values for the attribute InvoiceStatus.InvoiceId in InvDB (FIG. 2) should be similar to those for InvoiceTerm.InvoiceId. (Note that there are no referential relationships between these two tables.)

In a similarity-based representation 316, the database 302 D is represented with a |D|×|D| matrix M, where |D| is the number of tables in D and the entry M[i, j] stores the similarity between the i-th and j-th tables in D. There are many different ways of evaluating the table similarity, each resulting in a different representation for the database 302. Currently, the embodiment employs the following procedure to evaluate the similarity between tables T and T':

1. Evaluate value similarity between attributes: For every two attributes X and Y, one from each table, compute their similarity as the Jaccard similarity between the sets of values in X and Y, i.e., $J(X, Y)=|X \cap Y|/|X \cup Y|$.

2. Discover matching attribute: This step then finds a set Z of matching attributes based on a greedy-matching strategy: (1) Let Z=0, U=all attributes in T, and V=all attributes in T'. (2) Find U∈U and V ∈V such that they have a maximum (positive) similarity among all pairs of attributes from U and V. (3) Add attribute pair (U, V) to Z, remove U from U and V from V. (4) Repeat steps 2 and 3 until no more such pairs can be found. For example, consider tables T=InvoiceStatus and T'=InvoiceTerm in InvDB. Suppose that J(T.InvoiceId, T'.InvoiceId)=0.75, J(T.InvoiceId, T'.TermType)=0.2, J(T.StatusCode, T'.TermType)=0.15, and no other attributes have similar values. Then, the first iteration will match attributes T.InvoiceId and T'.InvoiceId, and the second (final) iteration will match T.StatusCode and T'.TermType.

3. Evaluate table similarity: The similarity of T and T', denoted as Sim(T, T'), is then given by the average similarity of their matching attributes:

$$\frac{\sum_{(x, y) \in z} \{J(X, Y)\}}{\min(|T|, |T'|)},$$

where |T| is the number of attributes in T. For example, Sim(InvoiceStatus, InvoiceTerm)=(0.75+0.15)/2=45.

To summarize this section, the embodiments stress that the goal is not to build best models (which typically do not exist), but to show that the embodiment can produce a better solution by building and combining many different (possibly imperfect) models.

3.2 The Base Clusterers

As described, the job of a base clusterer 320 is to take a database 302 representation and discover a preliminary clustering 322 over the tables in the database 302. Rather than building the individual clusterers separately and repeatedly, the embodiment first implements several generic clustering methods and then instantiates them into clusterers. In this section, the disclosure first describes two generic methods: one is similarity-based and the other linkage-based. The embodiments then show how to instantiate the former into clusterers for the vector-based and similarity-based representations, and the latter into clusterers for the graph-based representations.

3.2.1 Generic Similarity-Based Method

FIG. 4 shows SimClust, a generic similarity-based clustering method. SimClust takes as the input a set of tables T={$T_1$, $T_2$, ..., $T_{|T|}$}, a similarity matrix M whose entry M[i,j] is the similarity between tables $T_i$ and $T_j$ in T, a cluster similarity function ClsrSim, and a clustering quality metric Q. It outputs C, a partition over the tables in T. Essentially, SimClust can be regarded as a highly customizable hierarchical agglomerative clustering method with an automatic stopping rule.

SimClust starts by putting each table in T in a cluster by itself. This generates the first version of the clustering $C^1$. The embodiment evaluates the quality of $C^1$ based on Q, the clustering quality metric. The embodiment also evaluates the similarities between the clusters in $C^1$, based on the similarity matrix M and the cluster similarity function ClsrSim. Next, the embodiment chooses two clusters with a maximum similarity and merges them into a single cluster. This generates the next version of the clustering $C^2$. The embodiment then repeats the above process until all the tables are placed in one cluster. Finally, SimClust returns as the output the clustering with a maximum Q value, among all the |T| versions of clusterings.

SimClust provides two customization points, ClsrSim and Q. ClsrSim is a cluster similarity function which takes the similarity matrix M and two clusters of tables, $C_x$ and $C_y$, and computes a similarity value between $C_x$ and $C_y$. There are many different ways of implementing ClsrSim, including single-link, complete-link, and group-average, where the cluster similarity is respectively taken to be the maximum, minimum, and average similarity between two tables, one from each cluster.

Q is a metric for evaluating the quality of clustering. Determining the number of clusters in a data set is a well-known difficult problem. Many methods have been proposed, such as elbow criterion, gap statistics, and cross-validation, but there is no best solution. Intuitively, a good clustering should be one such that objects within the same cluster are similar while objects from different clusters are dissimilar. Based on this intuition, one possible implementation of Q is given as follows:

$$Q(C) = \sum_{C_i \in C} \frac{|C_i|}{N} * (IntraSim(C_i) - InterSim(C_i)) \quad (1)$$

where C is a clustering, N is the total number of tables in the database, and $|C_i|$ is the number of tables in cluster $C_i \in C$. IntraSim($C_i$) is the average similarity of tables within the cluster $C_i$, while InterSim($C_i$) is the maximum similarity of Ci with any other cluster in C, where the cluster similarity is the average similarity of tables between clusters. This default Q is intuitive, easy to implement, and has performed quite well over several databases in the experiments. But note that Q is customizable to other possible implementations (see Section 3.2.3).

3.2.2 Generic Linkage-Based Method

Figure 6:
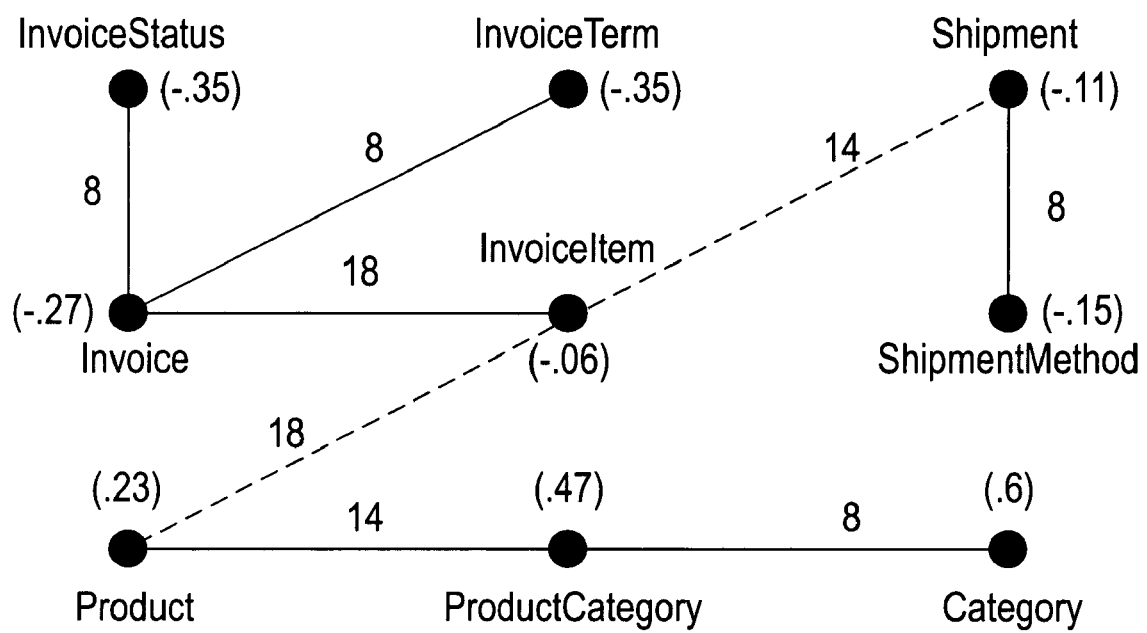
FIG. 6 is a schematic diagram illustrating relations between tables.

FIG. 5 shows LinkClust, a generic linkage-based method. Unlike SimClust, LinkClust discovers groups of related tables based on their linkage information. For example, FIG. 6 shows the tables in InvDB (FIG. 2) and their linkage information. (The details on how to obtain this graph will be given in Section 3.2.3).

The main idea of LinkClust is to formulate the problem as one of discovering community structure in an interconnected network, e.g., a social network or the Internet. One observation is that often the links within a community are dense, while the links between communities are relatively sparse. By finding and removing those inter-community links, the embodiments may reveal the communities in the network. For example, dotted edges in FIG. 6 are the inter-community links in the graph. LinkClust takes as the input: (1) a set of tables T; (2) an undirected graph G whose vertices are tables in T and edges indicate the linkage between the tables; (3) a function EdgeDel that suggests edges to be removed from G; and (4) a metric Q' on the clustering quality. It returns a partition of tables in T as the output. LinkClust is a divisive method. It starts by finding connected components in G, which forms the first version of the clustering. It then removes edges suggested by the EdgeDel function from G to produce the next version of the clustering. The process is repeated until no edges remain in G. Finally, the version of the clustering with the highest Q' value is returned as the output.

LinkClust also has two customization points: EdgeDel and Q'. The embodiments first describe two possible implementations of EdgeDel: one based on shortest-path betweenness, and the other based on spectral graph theory.

Shortest-path betweenness (SP): The idea is to first find the shortest paths between the vertices, and then measure the betweenness of an edge (i.e., the possibility of the edge lying between two clusters) by the fraction of the shortest paths that contain the edge. For example, in the linkage graph shown in FIG. 6, the number of shortest paths that contain the edge (InvoiceItem, Product) (an intercommunity link) is 18 (shown on the edge), the maximum among all the edges, while the number for the edge (Invoice, InvoiceTerm) (a within-community link) is only 8.

More precisely, the betweenness of an edge e∈E, denoted as β(e), is given by:

$$\beta(e) = \sum_{s,t \in V, s \neq t} \frac{\sigma_{st}(e)}{\sigma_{st}},$$

where $\sigma_{st}$ is the number of distinct shortest paths between vertices s and t, and $\sigma_{st}(e)$ is the number of distinct shortest paths between s and t that contain the edge e. EdgeDel(G) then returns an edge with a maximum β value.

Spectral graph partitioning (SPC): In this case, EdgeDel returns an edge-cut of G, which comprises a set of edges which are likely lying between two clusters. Spectral graph theory provides an elegant way of finding a good edge-cut. Specifically, consider G's Laplacian matrix LG=DG−AG, where DG is a diagonal matrix whose entry D[i, i] is the degree of the i-th vertex in G, and AG is G's adjacency matrix. Then it can be shown that finding a minimum edge-cut of G corresponds to finding the smallest positive eigenvalue $\lambda_2$ of $L_G$.

Further, the eigenvector for $\lambda_2$ (known as Fiedler's vector) suggests a possible bi-partitioning of the vertices in G, where the vertices with positive values are placed in one cluster and the vertices with negative values in the other cluster. For example, FIG. 6 shows these values next to the vertices. Accordingly, the three tables about product will be placed in one cluster, and the rest of the tables in another cluster. Note that if G contains several connected components, EdgeDel finds edge-cuts for larger components (with more vertices) first.

Metric Q': Similar to Q in SimClust, Q' measures the quality of clusterings in LinkClust. Q' captures the intuition that a good partition of the network should be one such that nodes within the same community are well-connected, while there are only few edges connecting different communities. Based on this intuition, the embodiment implements a default Q' as follows:

$$Q'(C) = \sum_{C_i \in C} \left( \frac{|E_{ii}|}{|E|} - \left( \frac{|E_i|}{|E|} \right)^2 \right) \quad (2)$$

where ↑E↑ is the total number of edges in the graph, $|E_{ii}|$ is the number of edges connecting two vertices both in the cluster $C_i$, and $↑E_i|$ is the number of edges that are incident to at least one vertex in $C_i$. Note that $|E_{ii}|/|E|$ is the observed probability that an edge falls into the cluster $C_i$, while $(|E_i|/|E|)^2$ is the expected probability under the assumption that the connections between vertices are random, i.e., without regard to the community structure. Finally, the embodiments note that Q' is also customizable to other implementations.

3.2.3 Generating Base Clusterers

The embodiments now generate base clusterers 320 by instantiating SimClust or LinkClust. The embodiments consider in turn the representations described in Section 3.1.

Vector-based representations: For vector-based representations, the embodiment generates base clusterers 320 by instantiating SimClust. Specifically, consider a database 302 D with a set of tables T={$T_1, T_2, \ldots, T|_T|$}, and denote the token vector for table $T_i$ as $\hat{T}_i$. First, for every two tables $T_i$, $T_j \in T$, the embodiment evaluates their similarity based on their token vectors. The similarity between two vectors may be evaluated in a variety of methods, e.g., via the Cosine function commonly employed in Information Retrieval, i.e., $$\cos(\hat{T}_i, \hat{T}_j) = \frac{\hat{T}_i \cdot \hat{T}_j}{\|\hat{T}_i\| \|\hat{T}_j\|}.$$

Note that multiple base clusterers 320 may be generated from the same representation by employing different methods for evaluating the vector similarities. Next, a similarity matrix M is constructed such that its entry M[i, j] holds the similarity between tables $T_i$ and $T_j$. Finally, a base clusterer is created by instantiating SimClust with T, M, and particular implementations of ClsrSim and Q. For example, if ClsrSim=single-link and Q=the default Q (Formula 1), then the generated base clusterer can be denoted as SimClust(T, M, single-link, default_Q).

Graph-based representations: For graph-based representations, the embodiment generates base clusterers 320 by instantiating LinkClust. Since LinkClust expects an undirected graph as the input, if the representation is a directed graph, e.g., a reference graph described in Section 3.1, it first needs to be transformed into an undirected graph. This is done by simply ignoring the directions of the edges in the original graph. For example, FIG. 6 shows the linkage graph transformed from the original reference graph for InvDB in FIG. 2. A base clusterer is then created based on LinkClust with particular T, G, EdgeDel, and Q'. For example, LinkClust (T, G, SP, default_Q') denotes a base clusterer where EdgeDel is implemented using the SP method, and the default implementation of Q' (Formula 2) is used.

Similarity-based representations: Similar to the case of vector-based representations 312, for similarity-based representations, the embodiment also generates base clusterers 320 by instantiating SimClust. The difference is that here the similarity matrix in the representation is directly used for the instantiation.

3.3 Aggregating Results via Meta-Clusterer

Given a set of m preliminary clusterings C={$C_1, C_2, \ldots, C_m$} from the base clusterers 320, the goal of the meta-clusterer 330 is to find a clustering C, such that C agrees with the clusterings in C as much as possible. More precisely, C and $C_i \in C$ disagree on the placement of two tables T, T'∈T, if one places them in the same cluster while the other places them in different clusters. Denote the number of disagreements among C and Ci as d(C, Ci). Then, the job of the meta-clusterer 330 is to find C that minimizes $$\sum_{i=1}^{m} d(C, C_i).$$

Similar problem has also been studied in the context of clustering aggregation and ensemble clustering. But these works focus mostly on combining different clustering methods (e.g., single-link vs. complete-link), and do not consider how to effectively combine different representation models.

TABLE 1

| Table | Meta-Clusterer | | | |
|---|---|---|---|---|
| | B1 | B2 | B3 | Meta |
| InvoiceStatus | 1 | 1 | 1 | 1 |
| InvoiceTerm | 1 | 1 | 1 | 1 |
| Invoice | 1 | 1 | 1 | 1 |
| InvoiceItem | 1 | 1 | 2 | 1 |
| Shipment | 2 | 2 | 2 | 2 |
| ShipmentMethod | 2 | 2 | 2 | 2 |
| Product | 3 | 3 | 3 | 3 |
| ProductCategory | 3 | 3 | 3 | 3 |
| Category | 4 | 3 | 3 | 3 |

For example, columns 2-4 of Table 1 above show the preliminary clusterings given by three base clusterers 320 Base 1 (B1), Base 2 (B2) and Base 3 (B3) on InvDB. The value j in the column for Base i indicates that Base i places the corresponding table in the j-th cluster of its clustering. For example, the second cluster in the clustering given by Base 1 contains tables Shipment and ShipmentMethod. Both Base 1 and 2 take a vector-based representation (with only table names) as the input and employ SimClust with the default Q measure. Base 1 uses complete-link for ClsrSim, while Base 2 uses single-link. Base 3 takes a linkage-based representation (the reference graph in FIG. 2) as the input and employs LinkClust with the default B and Q'.

It is interesting to note that Base 1 finds four clusters while Base 2 finds three (the cluster on Product in Base 2 is split into two clusters: {Product, ProductCategory} and {Category} in Base 1). Furthermore, InvoiceItem is placed in the Shipment cluster by Base 3. This is due to the fact that the betweenness score (18) for the edge (InvoiceItem, Invoice) is slightly larger than the score (14) for the edge (InvoiceItem, Shipment).

The last column of Table 1 shows the clustering C obtained by the meta-clusterer 330, denoted as Meta (see below for the details on Meta). Note that there are two disagreements between Meta and Base 1: on Category and Product, and Category and ProductCategory. It can be shown that the total number of disagreements among Meta and the three base clusterers 320 is seven, the minimum among all possible C's.

The problem of finding the best aggregated clustering can be shown to be NP-complete. Several approximation methods have been developed, and most of them are based on a majority-voting scheme. The meta-clustering method in the embodiment is also based on a voting scheme, but has a difference. Unlike other solutions, e.g., an Agglomerative method, it does not assume an explicit clustering threshold (e.g., ½ of the votes). Instead, it automatically determines an appropriate number of clusters in the aggregated clustering, based on the particular votes from the input clusterers.

Figure 7:
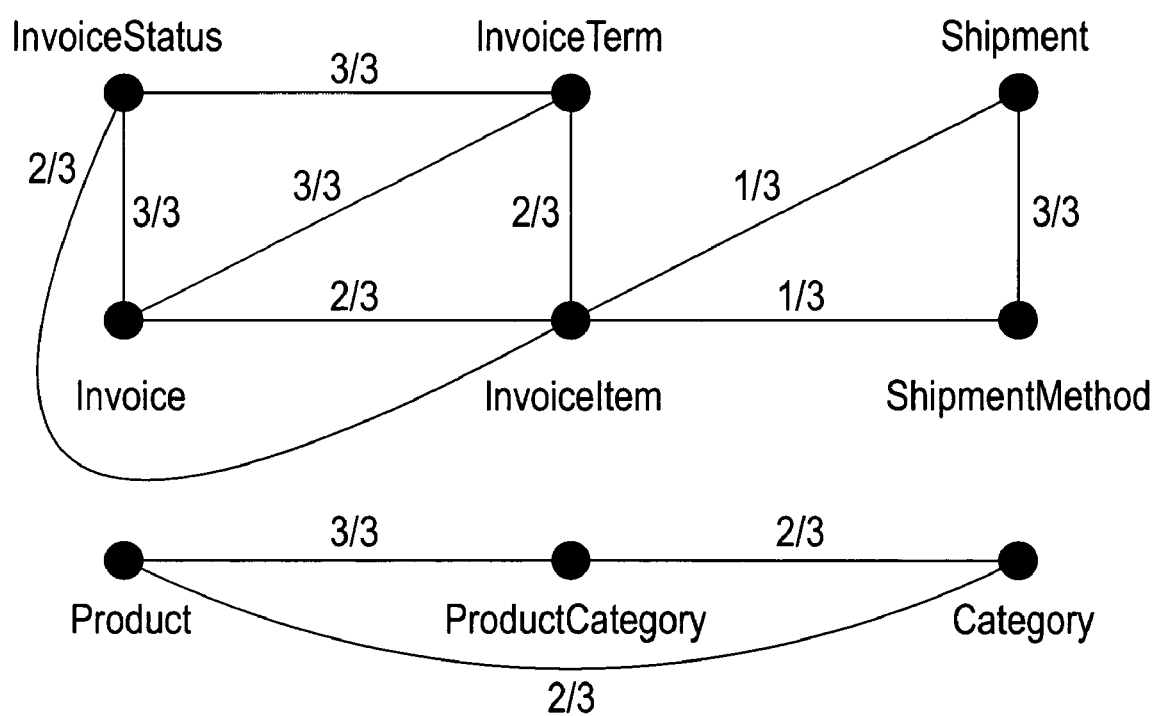
FIG. 7 is a schematic diagram illustrating relations between tables.

Meta-Clustering: The method involves two phases: (a) vote-based similarity evaluation and (b) re-clustering. With respect to vote based similarity evaluation, consider two tables T, T'∈T and a clustering $C_i \in C$. A vote from $C_i$ on the topical relationship between T and T' is given by a 0/1 function $V_{T,T'}(C_i)$, which takes on the value one if T and T' are placed in the same cluster in the clustering $C_i$, and zero otherwise. Based on the votes from the base clusterers 320, the similarity between two tables T, T'∈T is computed as:

$$\frac{1}{m}\sum_{i=1}^{m} V_{T,T'}(C_i),$$

where m is the number of base clusterers 320. For example, FIG. 7 shows the similarities between the tables in InvDB, based on the votes from B1, B2, and B3. Next, a similarity matrix $M_v$ is constructed from the above similarities. The embodiment then generates the meta-clusterer as SimClust (T, $M_v$, single-link, default_Q). But note that other options for ClsrSim and Q may be used.

4. Handling Complex Aggregations

In this section, the disclosure extends to handle complex aggregations. The disclosure first describes how to exploit the prior knowledge on the inherent property of the clusterers to organize them into an aggregation tree, to perform a multi-level aggregation. The disclosure then describes how to adjust the weights of certain clusterers in the run-time based on their actual performance, to achieve a more effective aggregation.

4.1 Multi-Level Aggregation

One difference between multi-level and flat aggregations is that in a flat or single-level aggregation, the clusterings 322 from all base clusterers 320 are aggregated at once by a single meta-clusterer 330, while in a multi-level aggregation, aggregation is performed by multiple meta-clusterers, with some meta-clusterers taking as the input the aggregated clusterings from the previous meta-clusterers.

Figure 8A:
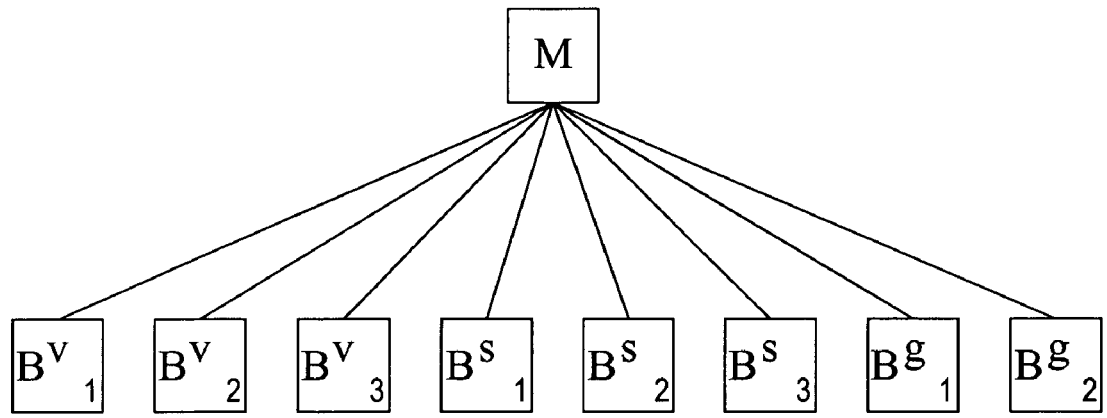
FIGS. 8(a) and 8(b) are schematic diagrams illustrating hierarchical aggregation structures.
Figure 8B:
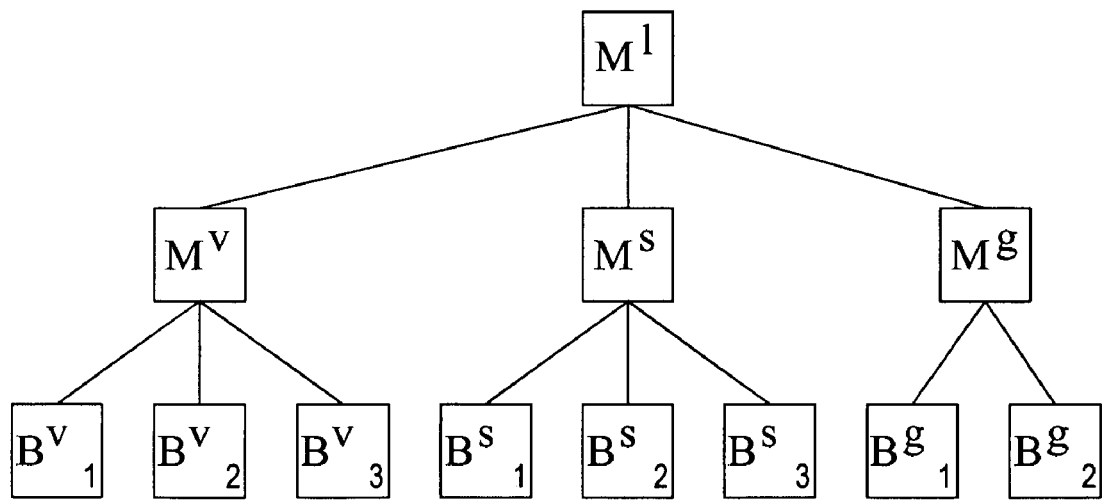

In general, the embodiments may represent the aggregation structure with an aggregation tree H. The leaf nodes of H correspond to base clusterers, while the internal nodes correspond to meta-clusterers, each aggregating the clusterings from its child clusterers. The level of the aggregation is the depth of the deepest internal node in H. For example, FIG. 8(a) shows a single-level aggregation tree with eight base clusterers (B's); FIG. 8(b) shows a two-level aggregation tree with four meta-clusterers (M's) on the same base clusterers.

Given a set of base clusterers, one problem is then how to form an effective aggregation tree. One observation is that the clusterers were not created equally and some are inherently more similar than others. For example, consider again the base clusterers in FIGS. 8(a) and 8(b). Suppose that $B_i^v$'s, $B_j^s$'s, and $B_k^g$'s, are respectively based on vector, similarity, and graph representations. Then, $B_1^v$ is more similar to $B_2^v$ than to $B_1^g$, since they are like experts with similar expertise, while the expertise of $B_1^v$ and $B_1^g$ may be quite different. Intuitively, if the embodiments are to correct the errors by $B_1^v$, then it may be more effective to compare it against $B_2^v$ or $B_3^v$, which has similar expertise, than $B_1^g$, which has quite different expertise.

For the tree construction: Motivated by the above observation, the embodiments define the similarity level of clusterers as follows: (a) Level 1 (the most similar): clusterers which take the same representation (e.g., a vector-based representation), but employ different clustering methods (e.g., single-link vs. complete-link versions of the similarity-based method); (b) Level 2: clusterers which take the same kind of representations (e.g., a vector-based representation constructed from table names vs. a vector-based representation constructed from both table & attribute names); and (c) Level 3: clusterers which take different kinds of representations (e.g., a vector-based vs. a graph-based representation). Furthermore, if one of the clusterers is a meta-clusterer, their similarity level is given by the least similarity level among all the base clusterers.

Based on the above definition, the aggregation tree is then constructed from a set of base clusterers in a bottom-up, clustering-like fashion. This involves the following steps: (1) Initialize a set W of current clusterers with all the base clusterers. (2) Determine the maximum similarity level l among all the clusterers in W. (3) Find a set S of all clusterers with the similarity level l. (4) Aggregate the clusterers in S using a meta-clusterer M and remove them from W. Add M into W. (5) Repeat steps 2-4 until there is only one clusterer left in W, which is the root meta-clusterer. For example, given the eight base clusterers shown in FIG. 8(a), the method produces the aggregation tree shown in FIG. 8(b), where $B_1^v$, $B_2^v$, and $B_3^v$ are first aggregated by $M^v$, which is further aggregated with $M^s$ and $M^g$ by $M^l$.

4.2 Clusterer Boosting

Unlike the multi-level aggregation which utilizes the static property of the clusterers, boosting exploits their dynamic behavior. The embodiment first estimates the performance of a clusterer by comparing it to other clusterers and then assigns more weights to the clusterers which are likely to be more accurate. The results from the clusterers are then re-aggregated based on the new weights. Specifically, consider a meta-clusterer M aggregating clusterings from a set of clusterers C={C1, . . . , Cn}. Boosting involves the following steps:

1. Determining a pseudo-solution: The pseudo-solution S consists of a set of table pairs (T, T') which the majority of the input clusterers place them in the same cluster. Following the notations in Section 3.3, the embodiments have $$S = \left\{ (T, T') \,\bigg|\, \sum_{i=1}^{m} V_{T,T'}(C_i) \right\}$$

>n/2}. For example, consider the meta-clusterer shown in Table 1. Table 2, below, lists the table pairs (out of 36 for InvDB) which are placed in the same cluster by at least one base clusterer. For each pair, it shows which base clusterers (columns 2-4) and whether the majority of the base clusterers (column MV) place them in the same cluster (indicated by 1/0). Then S comprises the 10 table pairs which have value 1 in the column MV.

TABLE 2

An Example on Clusterer Boosting

| Table Pairs | B1 | B2 | B3 | MV |
|---|---|---|---|---|
| (InvoiceStatus, InvoiceTerm) | 1 | 1 | 1 | 1 |
| (InvoiceStatus, Invoice) | 1 | 1 | 1 | 1 |
| (InvoiceStatus, InvoiceItem) | 1 | 1 | 0 | 1 |
| (InvoiceTerm, Invoice) | 1 | 1 | 1 | 1 |
| (InvoiceTerm, InvoiceItem) | 1 | 1 | 0 | 1 |
| (InvoiceItem, Invoice) | 1 | 1 | 0 | 1 |
| (InvoiceItem, Shipment) | 0 | 0 | 1 | 0 |
| (InvoiceItem, ShipmentMethod) | 0 | 0 | 1 | 0 |
| (Shipment, ShipmentMethod) | 1 | 1 | 1 | 1 |
| (Product, ProductCategory) | 1 | 1 | 1 | 1 |
| (Product, Category) | 0 | 1 | 1 | 1 |
| (ProductCategory, Category) | 0 | 1 | 1 | 1 |

2. Ranking input clusterers: S is then utilized to evaluate the input clusterers $C_i$'s. For this, the embodiment employs a measure ψ which is taken to be the percentage of table pairs in S that are found by Ci (i.e., $V_{T,T'}(C_i)$=1). For example, ψ(B1)=0.8, ψ(B2)=1, and ψ(B3)=0.7. $C_i$'s are then ranked by their ψ scores. For example, the embodiments have B2>B1>B3.

3. Adjusting weights: First, set the initial weights for all clusterers in C to 1. Consider top k clusterers in C, for a desired number k. Select the clusterer with the best score, increase its weight to 2. Repeatedly find a clusterer $C_i$ with next best score. If $C_i$ is not highly correlated with any previously selected clusterers, set its weight to 2; otherwise, move to the next best clusterer (intuitively, this is because a clusterer with similar expertise has already been boosted). The correlation between two clusterers $C_i$ and $C_j$ is given by their correlation coefficient: $\rho_{ci}$, $x_{cj}$=cov($X_{ci}$, $X_{cj}$)/$\sigma x_{ci} \sigma x_{cj}$, where $X_{ci} = V_{T,T'}(C_i)$ is a random variable corresponding to the clusterer Ci, and the sample space is taken to be the set of all table pairs (T, T'), where T≠T'. Based on a well-known rule-of-thumb from Statistics, two clusterers may be regarded to be highly correlated if their |ρ|≧0.3.

For example, the sample space for InvDB contains 36 table pairs (12 of them are shown in Table 2). It can be shown that ρ(B1, B2)=0.86, ρ(B1, B3)=0.46, and ρ(B2, B3)=0.64. B2 will first be boosted; since B2 is highly correlated to both B1 and B3, no other clusterers will be boosted.

5. Finding Cluster Representatives

In a complex database, there may be a large number of tables on the same topic. As a result, it is often desirable to discover important tables within each cluster. These tables are cluster representatives. They serve as the entry points to the cluster and give users a general idea of what the cluster is about. In addition, the names of these representative tables may be used to label the cluster as FIG. 1(b) illustrates. In this section, the embodiments describe the representative finder component 340. One issue in discovering representative tables 342 is a measure on the importance of tables. One observation is that if a table is important, then it should be at a focal point in the linkage graph for the cluster. Motivated by this observation, embodiments herein measure the importance of a table based on its centrality score on the linkage graph. Specifically, given a linkage graph G(V,E), the centrality of a vertex v∈V, denoted as ξ(v), is computed as follows:

$$\varepsilon(v) = \sum_{s,t \in V, s \neq t} \frac{\sigma_{st}(v)}{\sigma_{st}} \quad (3)$$

where $\sigma_{st}$ is the number of distinct shortest paths between vertices s and t, while $\sigma_{st}(v)$ is the number of distinct shortest paths between s and t that pass through the vertex v. Based on this definition, this disclosure now describes the representative discovery method RepDisc in detail.

For the representative discovery, RepDisc takes as the input a clustering C={$C_1, C_2, \ldots, C_k$} over the tables in the database D, a linkage graph G of D, and a desired number r. It returns as the output up to r representative tables for each cluster in C. Consider a cluster $C_i \in C$, RepDisc proceeds as follows to find representatives for Ci. (1) Obtain the linkage graph $G_{Ci}$ for the tables in the cluster $C_i$. $G_{ci}$ is a subgraph of G induced by a set of tables in $C_i$. For example, consider the clustering C from the meta-clusterer Meta shown in Table 1. C contains three clusters {$C_1$, $C_2$, $C_3$}, e.g., $C_1$={InvoiceStatus, Invoice, InvoiceItem, InvoiceItem}. FIG. 9 shows the linkage graphs for these clusters, induced from the complete linkage graph in FIG. 6. (2) Evaluate centrality scores for the tables in $C_i$ using Formula 3. (3) Rank the tables by the descending order of their centrality scores, and return top r tables in the ranked list. For example, suppose r=1, the discovered representative tables for the clusters in FIG. 9 are highlighted with their names bolded.

For the complexity of RepDisc, for each of the k clusters in C, three steps are executed. Consider cluster $C_i \epsilon C$ and denote the induced graph for $C_i$ as $G(V_r, E_r)$, where $V_r$ is a set of tables in $C_i$ and $E_r$ is a set of linkage edges between the tables in $C_i$. In step 1, for every two tables in $V_r$, the embodiments need to determine if there is an edge between them. Suppose G is implemented with an adjacency matrix. This can be done in $O(|V_r|^2)$. Further, the time to create the graph is $O(|V_r|+|E_r|)$. Thus, the overall complexity of step 1 is $O(|V_r|^2)$ (since $|E_r|$ is $O(|V_r|^2)$). Step 2 can be implemented based on Brandes's method, where the complexity can be shown to be $O(|V_r|*|E_r|)$. The complexity of step 3 is $O(|V_r|)$. So the overall complexity for steps 1-3 is $O(|V_r|*|E_r|)$, with the dominant factor being the time for step 2. Assume that each cluster contains about the same number of tables with roughly the same amount of linkage between the tables, the complexity of RepDisc is $O(k*|V_r|*|E_r|)=O(k*|V|/k*|E|/k)=O(|V|*|E|/k)$. In other words, it is about 1/k of the time for computing centrality scores for the entire graph G.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
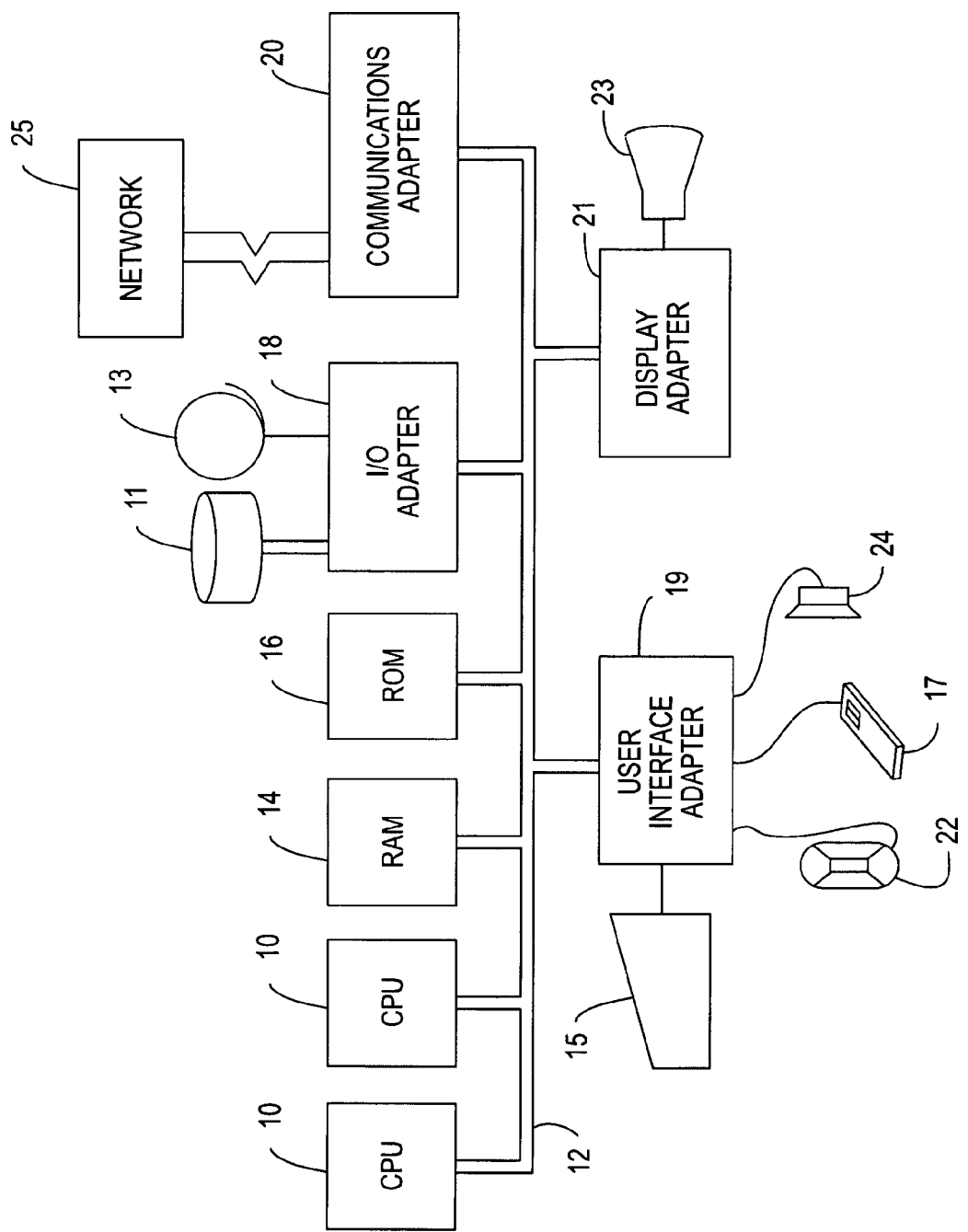
FIG. 10 is a schematic diagram of a system for operating embodiments herein.

A representative hardware environment for practicing the embodiments of the invention is depicted in FIG. 10. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

In summary, the embodiments formally define the problem of discovering topical structures of databases and demonstrate how topical structures can support semantic browsing and large-scale data integration. The embodiments propose a multi-strategy discovery framework and describe the embodiment system which realizes this framework. The system is fully automatic & highly extensible to other representations and clusterers. The embodiments propose clustering aggregation techniques to address limitations of existing solutions. The embodiments describe an approach to discovering representative tables using a measure on table importance. The embodiments discover topical clusters of tables with a high degree of accuracy.

Therefore, while the embodiments of the invention have been described in terms of preferred embodiments, those skilled in the art will recognize that the embodiments of the invention can be practiced with modification within the spirit and scope of the appended claims.

What is claimed is:

1. A method for automatically discovering topical structures of at least one database comprising tables, said method comprising:

computing various kinds of representations for said database based on schema information and data values of said database, wherein said representations comprise representations that are at least two of: vector-based representations; graph-based representations; and similarity-based representations;

performing preliminary topical clustering of tables within said database to produce a plurality of clusterings, such that each of said clusterings corresponds to one representation;

aggregating results of said clusterings into a final clustering, such that said final clustering comprises a plurality of topical clusters;

identifying representative tables from said topical clusters in said final clustering, wherein at least one representative table is identified for each of said topical clusters in said final clustering;

arranging said representative tables by topic as a topical directory of said representative tables; and outputting said topical directory.

2. The method according to claim 1, wherein in said vector-based representations, each table of said database is represented as a text document, wherein in said graph-based representations, said database is represented as a graph, tables of said database are represented as nodes, and edges of said graph are represented as linkages between said tables, and wherein in said similarity-based representation, said database is represented as a similarity matrix with table similarities computed from attribute values.

3. The method according to claim 1, wherein said preliminary topical clustering is discovered by employing one of similarity-based clustering and linkage-based clustering.

4. The method according to claim 1, wherein said determining of said representative tables is based on table importance.

5. A method for automatically discovering topical structures of at least one database comprising tables, said method comprising:

computing various kinds of representations for said database based on schema information and data values of said database, wherein said representations comprise representations that are at least two of: vector-based representations; graph-based representations; and similarity-based representations;

performing topical clustering of tables within said database to produce a plurality of clusterings, wherein said topical clustering is performed such that each of said topical clusterings corresponds to one set of said tables on a same topic and such that each of said topical clusterings corresponds to one representation;

aggregating results of said clusterings into a final clustering, such that said final clustering comprises a plurality of said topical clusters;

identifying representative tables from said topical clusters in said final clustering, wherein at least one representative table is identified for each of said topical clusters in said final clustering;

arranging said topical clusters by topic as a topical directory; and outputting said topical directory.

6. The method according to claim 5, wherein in said vector-based representations, each table of said database is represented as a text document, wherein in said graph-based representations, said database is represented as a graph, tables of said database are represented as nodes, and edges of said graph are represented as linkages between said tables, and wherein in said similarity-based representation, said database is represented as a similarity matrix with table similarities computed from attribute values.

7. The method according to claim 5, wherein said topical clustering is discovered by employing one of similarity-based clustering and linkage-based clustering.

8. A non-transitory computer program storage medium tangibly embodying a program of instructions executable by a computer to perform a method for automatically discovering topical structures of at least one database comprising tables, said method comprising:

computing various kinds of representations for said database based on schema information and data values of said database, wherein said representations comprise representations that are at least two of: vector-based representations; graph-based representations; and similarity-based representations;

performing preliminary topical clustering of tables within said database to produce a plurality of clusterings, such that each of said clusterings corresponds to one of said representations;

aggregating results of said clusterings into a final clustering, such that said final clustering comprises a plurality of said topical clusters;

identifying representative tables from said topical clusters in said final clustering, wherein at least one representative table is identified for each of said topical clusters in said final clustering;

arranging said representative tables by topic as a topical directory of said representative tables; and outputting said topical directory.

9. The computer program storage medium according to claim 8, wherein in said vector-based representations, each table of said database is represented as a text document, wherein in said graph-based representations, said database is represented as a graph, tables of said database are represented as nodes, and edges of said graph are represented as linkages between said tables, and wherein in said similarity-based representation, said database is represented as a similarity matrix with table similarities computed from attribute values.

10. The computer program storage medium according to claim 8, wherein said preliminary topical clustering is discovered by employing one of similarity-based clustering and linkage-based clustering.

11. The computer program storage medium according to claim 8, wherein said determining of said representative tables is based on table importance.

12. A system for automatically discovering topical structures of at least one database comprising tables, said system comprising:

a model builder, executing on a processor, configured to compute various kinds of representations for said database based on schema information and data values of said database, wherein said model builder is configured to compute said representations that are at least two of: vector-based representations; graph-based representations; and similarity-based representations;

a plurality of base clusterers, wherein each base clusterer corresponds to one of said kinds of representations, and each base clusterer is configured to perform, for a corresponding representation, preliminary topical clustering of tables within said database to produce a plurality of topical clusters, such that each of said topical clusters corresponds to a set of said tables on the same topic;

a meta-clusterer configured to aggregate results of said topical clusters into a final clustering, such that said final clustering comprises a plurality of said topical clusters; and a representative finder configured to identify representative tables from said topical clusters in said final clustering, wherein at least one representative table is identified for each of said topical clusters in said final clustering, and wherein said representative finder is further configured to arrange said representative tables by topic as a topical directory of said representative tables and output said topical directory.

13. The system according to claim 12, wherein in said vector-based representations, each table of said database is represented as a text document, wherein in said graph-based representations, said database is represented as a graph, tables of said database are represented as nodes, and edges of said graph are represented as linkages between said tables, and wherein in said similarity-based representation, said database is represented as a similarity matrix with table similarities computed from attribute values.

14. The system according to claim 12, wherein each base clusterer is configured to perform one of similarity-based clustering and linkage-based clustering.

15. The system according to claim 12, wherein said representative finder is configured to determine said representative tables based on table importance.

* * * * *